(12) United States Patent
Kondoh

(10) Patent No.: US 11,659,103 B2
(45) Date of Patent: May 23, 2023

(54) IMAGE FORMATION APPARATUS AND IMAGE FORMATION METHOD

(71) Applicant: SHARP KABUSHIKI KAISHA, Sakai (JP)

(72) Inventor: Yoshikazu Kondoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/578,197

(22) Filed: Jan. 18, 2022

(65) Prior Publication Data

US 2022/0232132 A1   Jul. 21, 2022

(30) Foreign Application Priority Data

Jan. 21, 2021   (JP) .............................. JP2021-008068

(51) Int. Cl.
*H04N 1/00* (2006.01)
*G06F 3/12* (2006.01)

(52) U.S. Cl.
CPC ....... *H04N 1/00244* (2013.01); *G06F 3/1204* (2013.01); *G06F 3/1207* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 2004/0012812 A1* | 1/2004 | Shimizu ................ | G06F 3/1222 358/1.14 |
| 2006/0007480 A1* | 1/2006 | Yokokura ............. | G06F 3/1259 358/1.15 |
| 2010/0086768 A1* | 4/2010 | Norsten ............... | C08K 5/0041 428/407 |

FOREIGN PATENT DOCUMENTS

JP    2006-023830 A    1/2006

* cited by examiner

*Primary Examiner* — Frantz Bataille
(74) *Attorney, Agent, or Firm* — ScienBiziP, P.C.

(57) ABSTRACT

An image formation apparatus to combine a plurality of processes to execute a job related to image formation, the image formation apparatus including: a communicator that sends and receives data to and from an external application via a network, an image data acquirer that acquires image data, an image former that forms an image based on the image data, a storage that stores temporary intermediate data involved in the image formation, a display that displays a message for a user, and a controller that controls the communicator, the image data acquirer, the image former, the storage, and the display; wherein upon performing a process of the plurality of processes, the controller determines whether a next process is present.

5 Claims, 21 Drawing Sheets

IMAGE FORMATION APPARATUS AND IMAGE FORMATION METHOD

BACKGROUND OF THE INVENTION

Field of the Invention

The present invention relates to an image formation apparatus and an image formation method, and more particularly, an image formation apparatus and an image formation method that combines a plurality of processes to execute a job related to image formation.

Description of the Background Art

Conventionally, in an image formation apparatus such as MFP (Multifunction Peripheral: multifunction peripheral apparatus), information leakage in intermediate data (or internal data) such as data scanned in processing of a job for copying, scanning, or printing, etc. or printing data is potentially a critical security incident, and thus is set to be deleted from a nonvolatile memory within the MFP at the end of the job.

Moreover, an image formation apparatus is also known which has a sophisticated security function to erase these intermediate data so as to prevent its reuse, or to inform a user about erasure as a message.

Such image formation apparatus displays an erasure message for a user at deletion of intermediate data. However, for example, in printing a plurality of copies, displaying an erasure message of intermediate data at the end of printing of each copy rather sometimes reduced user convenience.

In connection with such problem, invention has been disclosed for notification system of completion of output that in print-out of certain application data, allowed a user to know a notice of job completion at the instance of completion of all the job without informing a user about a plurality of completion notices of output corresponding to the number of output copies (see, e.g., Japanese Patent Application Laid-Open Publication No. 2006-23830).

Meanwhile, among current image formation apparatuses, an apparatus is also known which not only uses a function such as copying solely in an integrated firmware, but also registers an application and the like made by a user such as an open API (Application Programming Interface), and performs copying and the like using the application.

Such image formation apparatus combines functions published externally as open architecture, and assembles a flow to execute a job such as copying, and intermediate data used by the apparatus is deleted upon completion of each one of the functions.

However, in some preset security levels, when an erasure message is displayed for deletion of intermediate data at completion of each one of the functions, a user in use of the apparatus may recognize as the data are deleted at an unexpected timing in spite of a job not being complete yet, thus having been likely to confuse the user.

The present invention was made in view of the circumstances as described above; and in use of a function published externally such as an open API, an erasure message of intermediate data is informed at an appropriate timing, thereby providing an image formation apparatus and an image formation method with higher user convenience than ever before.

SUMMARY OF THE INVENTION (1) An image formation apparatus according to an embodiment of the present invention is an image formation apparatus for combining a plurality of processes to execute a job related to image formation; the image formation apparatus including a communicator that sends and receives data to and from an external application via a network, an image data acquirer that acquires image data, an image former that forms an image based on the image data, a storage that stores temporary intermediate data involved in the image formation, a display that displays a message for a user, and a controller that controls the communicator, the image data acquirer, the image former, the storage, and the display; wherein upon performing a process of the plurality of processes, the controller determines whether a next process is present, and if a next process is present, the controller erases the intermediate data and then proceeds to the next process without making the display display an erasure message indicating erasure of the intermediate data, while if a next process is absent, the controller erases the intermediate data and then makes the display display an erasure message indicating erasure of the intermediate data.

Furthermore, an image formation method according to an embodiment of the present invention is an image formation method of combining a plurality of processes to execute a job related to image formation, the method including: communication to send and receive data to and from an external application via a network, image data acquisition to acquire image data, image formation to form an image based on the image data, storage to store temporary intermediate data involved in the image formation, and displaying to display a message for a user; wherein upon performing a process of the plurality of processes, if a next process is present, the intermediate data are erased and followed by proceeding to the next process without displaying an erasure message indicating erasure of the intermediate data, while if a next process is absent, the intermediate data are erased and followed by displaying an erasure message indicating erasure of the intermediate data in the displaying.

In the present invention, "image formation apparatus" is an apparatus that forms and outputs an image, such as a copier or a multifunction printer with a copying (copy) function such as a printer that uses electrophotography system for image formation with toner, or MFP (Multifunctional Peripheral: multifunctional peripheral apparatus) that also includes a function other than copying.

According to the present invention, when a function published externally such as an open API is used to combine a plurality of processes to execute a job related to image formation, an erasure message of intermediate data is informed at an appropriate timing, thereby providing an image formation apparatus and an image formation method with higher user convenience than ever before.

Moreover, preferred aspects of the present invention will now be described.

(2) When the controller erases the intermediate data and then proceeds to a next process without making the display display an erasure message indicating erasure of the intermediate data, the controller may make the display display an erasure message indicating erasure of the intermediate data after a lapse of predetermined hold time.

With this, even if a series of processes fails to continue to the last due to some malfunction, an erasure message indicating erasure of the intermediate data is capable of being displayed after a lapse of predetermined hold time, thereby providing an image formation apparatus with higher user convenience than ever before.

(3) When the controller performs a process and then has a next process to be performed, the controller may determine whether intermediate data are to be transferred, and if the intermediate data are not to be transferred, the controller may erase the intermediate data and then proceed to a next process without making the display display an erasure message indicating erasure of the intermediate data, while if the intermediate data are to be transferred, the controller may make the display display an erasure message indicating erasure of the intermediate data after a lapse of predetermined hold time.

With this, if a next process is present, an erasure message of intermediate data is informed at an appropriate timing depending on presence or absence of intermediate data to be transferred; and furthermore, even if a series of processes fails to continue to the last due to some malfunction, intermediate data are capable of being surely erased; thereby providing an image formation apparatus with higher user convenience than ever before.

(4) The controller may erase the intermediate data if having a next process, and then determine whether a message prespecified by user is stored in the storage, and if the message is stored, the controller may make the display display the message, while if the message is not stored, the controller may proceed to a next process without making the display display the message.

With this, an erasure message prespecified by a user is informed at an appropriate timing depending on presence or absence of a prespecified message, and furthermore, intermediate data are capable of being surely erased even if a series of processes fails to continue to the last due to some malfunction, thereby providing an image formation apparatus with higher user convenience than ever before.

DESCRIPTION OF THE PREFERRED EMBODIMENTS

The present invention will now be described in more detail with use of the drawings. Here, the following description is exemplification in all respects, and should not be construed to limit the present invention.

Embodiment 1

On the basis of FIG. 1-FIG. 3, description will be made for a digital multifunction printer 1, which is an embodiment of image formation apparatuses according to the present invention.

Figure 1:
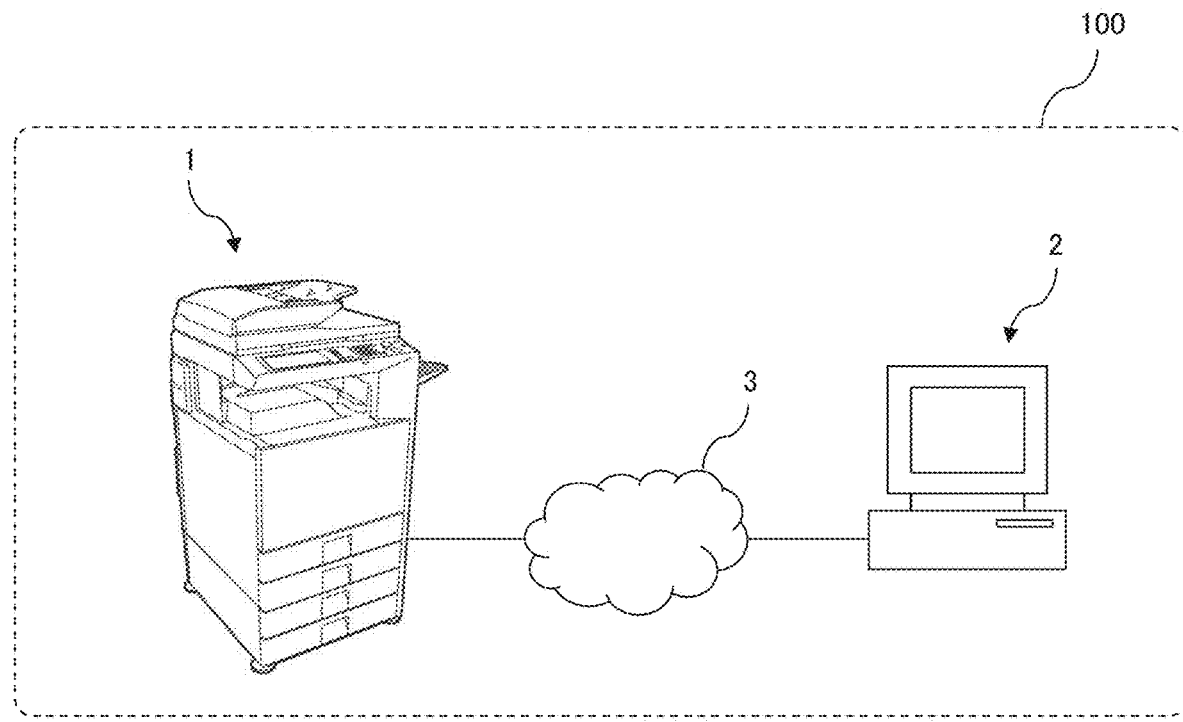
FIG. 1 is an illustration showing an exemplary configuration of an image formation system according to the present invention.

FIG. 1 is an illustration showing an exemplary configuration of an image formation system 100 according to the present invention.

Figure 2:
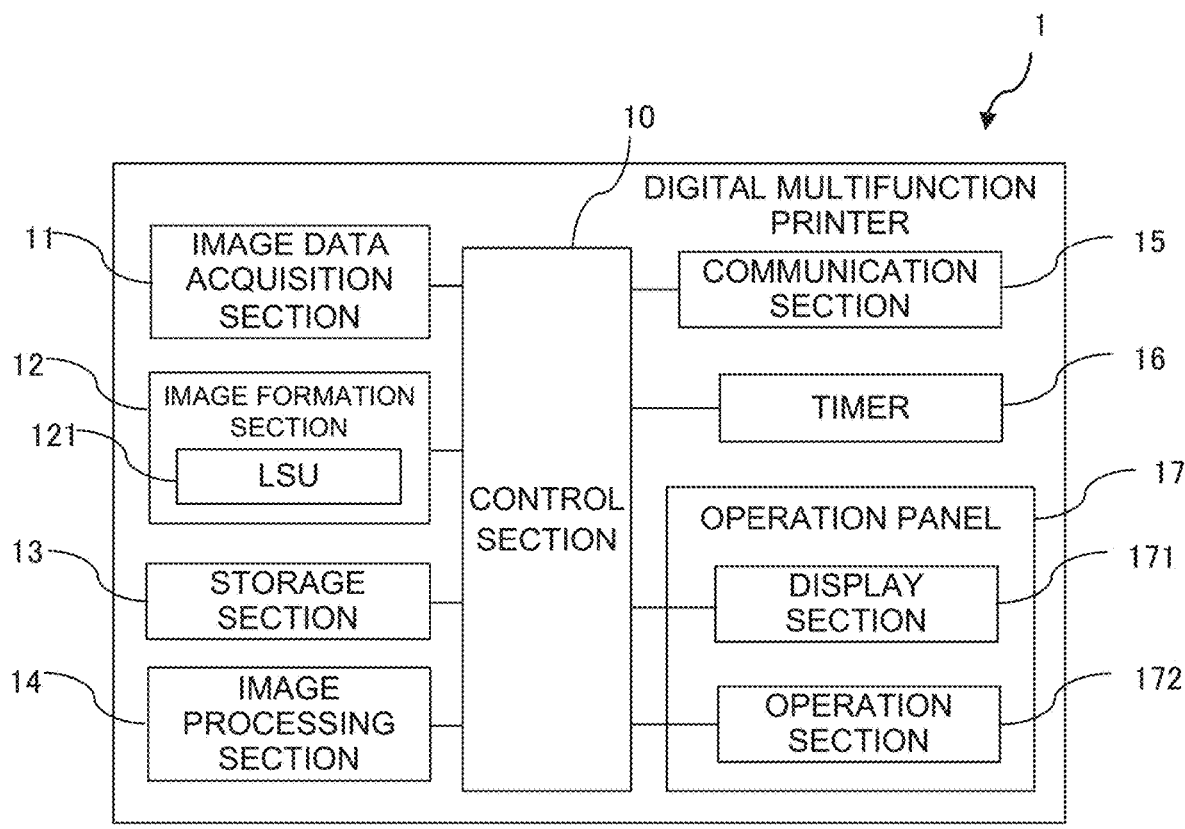
FIG. 2 is a block diagram showing a schematic configuration of the digital multifunction printer in FIG. 1.

FIG. 2 is a block diagram showing a schematic configuration of the digital multifunction printer 1 in FIG. 1.

Figure 3:
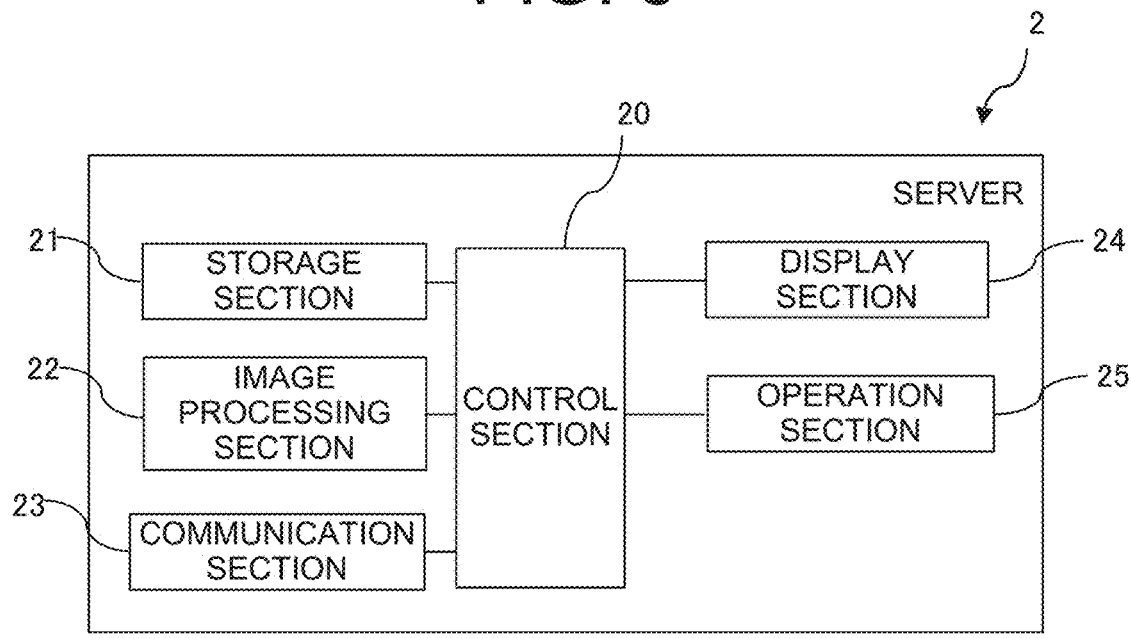
FIG. 3 is a block diagram showing a schematic configuration of the server in FIG. 1.

FIG. 3 is a block diagram showing a schematic configuration of the server 2 in FIG. 1.

As shown in FIG. 1, the image formation system 100 according to the present invention is configured of a digital multifunction printer 1 and a server 2 connected via a network 3.

The digital multifunction printer 1 is an apparatus that digitally processes an image data and has a copying function, a printer function, a scanner function, a facsimile function, and the like, such as a multifunction printer or an MFP (Multifunction Peripheral: multifunction peripheral apparatus).

The server 2 sends and receives image data to and from the digital multifunction printer 1 via the network 3.

As shown in FIG. 2, the digital multifunction printer 1 includes a controller 10, an image data acquirer 11, an image former 12, a storage 13, an image processor 14, a communicator 15, a timer 16, and an operation panel 17.

Hereinafter, description will be made for each component of the digital multifunction printer 1.

The controller 10 controls the digital multifunction printer 1 in an integrated manner, and consists of a CPU (Central Processing Unit), an RAM (Random Access Memory), an ROM (Read Only Memory), and various interface circuits, and the like.

The controller 10 performs monitoring and control of all loads such as detection of each sensor, a motor, a clutch, and the operation panel 17, in order to control action of the whole of the digital multifunction printer 1.

The image data acquirer 11 is a section that detects and reads out a manuscript placed on a manuscript plate, a manuscript conveyed from a manuscript tray, or the like, and forms image data.

The image former 12 is a section that prints out on a sheet the image data obtained by the image data acquirer 11 and processed by the image processor 14, and includes an LSU 121.

The LSU 121 is an apparatus that irradiates laser light corresponding to information of image data consisting of digital signals on the surface of a charged photoconductor drum not depicted, and forms an electrostatic latent image.

The storage 13 is an element, a storage medium, or the like that stores information required for achieving various functions of the digital multifunction printer 1, a control program, and the like. For example, a semiconductor element such as an RAM or an ROM, or a storage medium such as a hard disk, a flash storage, or an SSD (solid state drive) is used.

The storage 13 stores intermediate data including information related to a job such as printing, and internal data required for execution of a job (work memory) such as image data.

Additionally, a program and data may be retained in different apparatuses, for example, so that configurations are made for a data retaining region in a hard disk drive and for a program retaining region in a flash storage.

The image processor 14 is a section that changes image data input from the image data acquirer 11 into an appropriate electric signal and perform processing so as to tailor the signal to output such as enlargement or reduction, on the basis of analysis result of an instruction of a job, such as printing, obtained from the server 2 or the like via the communicator 15.

The communicator 15 is a section that communicates via the network 3 with the server 2 and other image formation apparatuses, a personal digital assistant, an information processing apparatus, a facsimile apparatus, and the like, and sends and receives data related an open API published externally.

The timer 16 is a section that measures and counts time, and for example, obtains time via a built-in watch or the network 3.

The operation panel 17 is configured of a display panel composed of a liquid crystal panel or the like, and a touch panel overlayed on the display panel and operated in a capacitive manner or the like that detects a position touched by a finger, and includes a display 171 and an operator 172.

The display 171 is a section that displays various information.

The display 171 is configured of, e.g., a CRT display, a liquid crystal display, or an EL display, and is a displaying apparatus such as a monitor or a line display, for allowing an operating system, an application software, or the like to display electric data such as a processing status.

The controller 10 displays an action and a status of the digital multifunction printer 1 via the display 171.

The operator 172 is an interface to operate the digital multifunction printer 1, and is a section that accepts an instruction from a user.

Schematic Configuration of Server 2

Next, on the basis of FIG. 3, description will be made for a schematic configuration of the server 2.

As shown in FIG. 3, the server 2 includes a controller 20, a storage 21, an image processor 22, a communicator 23, a display 24, and an operator 25.

Here, the controller 20, the storage 21, the image processor 22, the communicator 23, the display 24, and the operator 25 respectively have the same configuration as that of controller 10, the storage 13, the image processor 14, the communicator 15, the display 171, and the operator 172 in FIG. 2, and thus description is omitted.

One Example of Displaying Processes for Erasure Message in Digital Multifunction Printer 1 of Embodiment 1 in the Present Invention Next, on the basis of FIG. 4-FIG. 9, description will be made for an exemplary displaying process for an erasure message in the digital multifunction printer 1 of Embodiment 1 according to the present invention.

Figure 4:
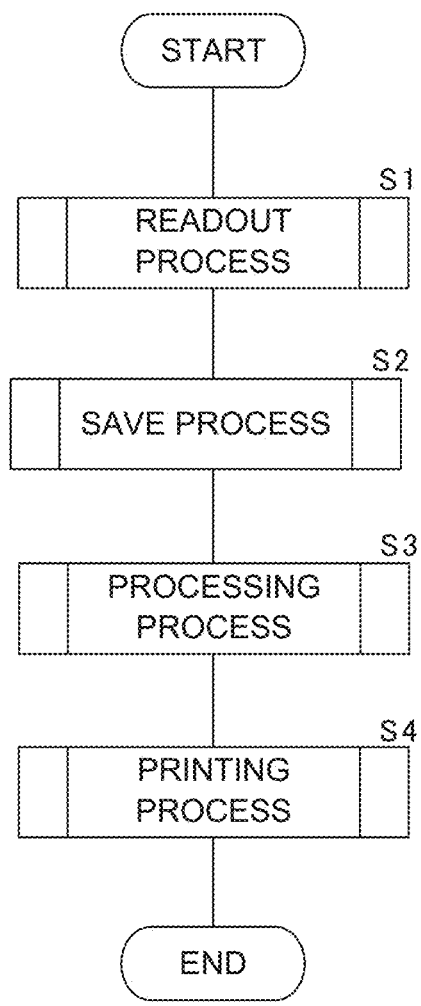
FIG. 4 is a flowchart showing a flow of a displaying process for an erasure message of the digital multifunction printer in FIG. 1.

FIG. 4 is a flowchart showing a flow of a displaying process for an erasure message of the digital multifunction printer 1 in FIG. 1.

In Embodiment 1, as shown in FIG. 4, the controller 10 in the digital multifunction printer 1 combines each process of "Readout Process" (step S1), "Save Process" (step S2), "Processing Process" (step S3), and "Printing Process" (step S4) and perform them sequentially, thereby achieving a copy job.

At "Readout Process" of step S1, the controller 10 scans e.g., an A4 manuscript laid on a manuscript table to read out image data (step S1).

Then, at "Save Process" of step S2, the controller 10 saves the read-out image data in the storage 13 of the digital multifunction printer 1 (step S2).

Then, at "Processing Process" of step S3, the controller 10 retrieves the image data saved in the storage 13, and makes the image processor 14 perform processing for e.g., reduction to 50% (step S3).

Finally, at "Printing Process" of step S4, the controller 10 makes the image former 12 print the processed data as print data on an A5 sheet (step S4).

By combining a series of processes in this manner, the controller 10 can microcopy an A4 manuscript sheet to an A5 sheet.

Upon this, in the series of processes described above, intermediate data (work memory) are generated in operation of each process.

If the digital multifunction printer 1 is set to have a low security level, these intermediate data may not be erased and remain as is within the storage 13 even after the end of the copy job.

Meanwhile, in performing these processes using an open API, remaining intermediate data may lead to a risk of leakage of confidential information to outside.

To prevent such problem, in performing these processes using an open API, security is preferably set at a high level to erase intermediate data for completion of each one of the processes.

Moreover, for every erasure of intermediate data, an erasure message thereof may also be displayed on the display 171, but such display for each process often provides a user with misleading such as loss of data, and rather reduces user convenience.

In Embodiment 1, even a single job as seen from a user achieves processing of intermediate data with high user convenience, when the job consists of a plurality of processes using an open API.

Figure 5:
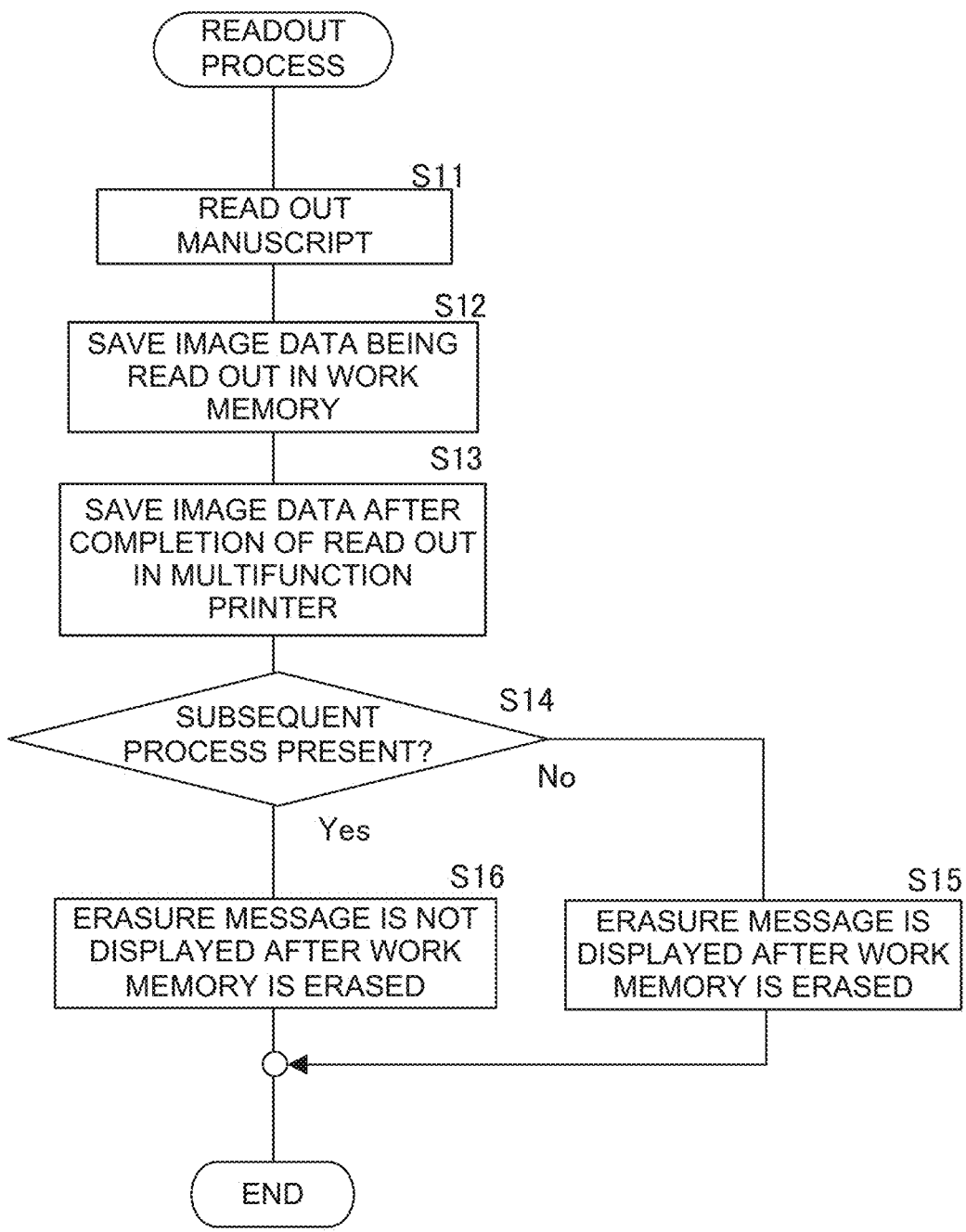
FIG. 5 is a flowchart showing an exemplary readout process in FIG. 4.

FIG. 5 is a flowchart showing an exemplary readout process in FIG. 4.

At step S11 in FIG. 5, the controller 10 makes the image data acquirer 11 scan and read out a manuscript sheet laid on a manuscript table (step S11).

Then, at step S12, the controller 10 saves image data being read out in work memory (step S12).

Then, at step S13, the controller 10 saves the image data after completion of read out in the storage 13 (step S13).

Then, at step S14, the controller 10 determines whether a subsequent process is present (step S14).

If a subsequent process is absent (if determination at step S14 is No), the controller 10 at step S15 erases work memory and then makes the display 171 display an erasure message informing the erasure (step S15).

Figure 6:
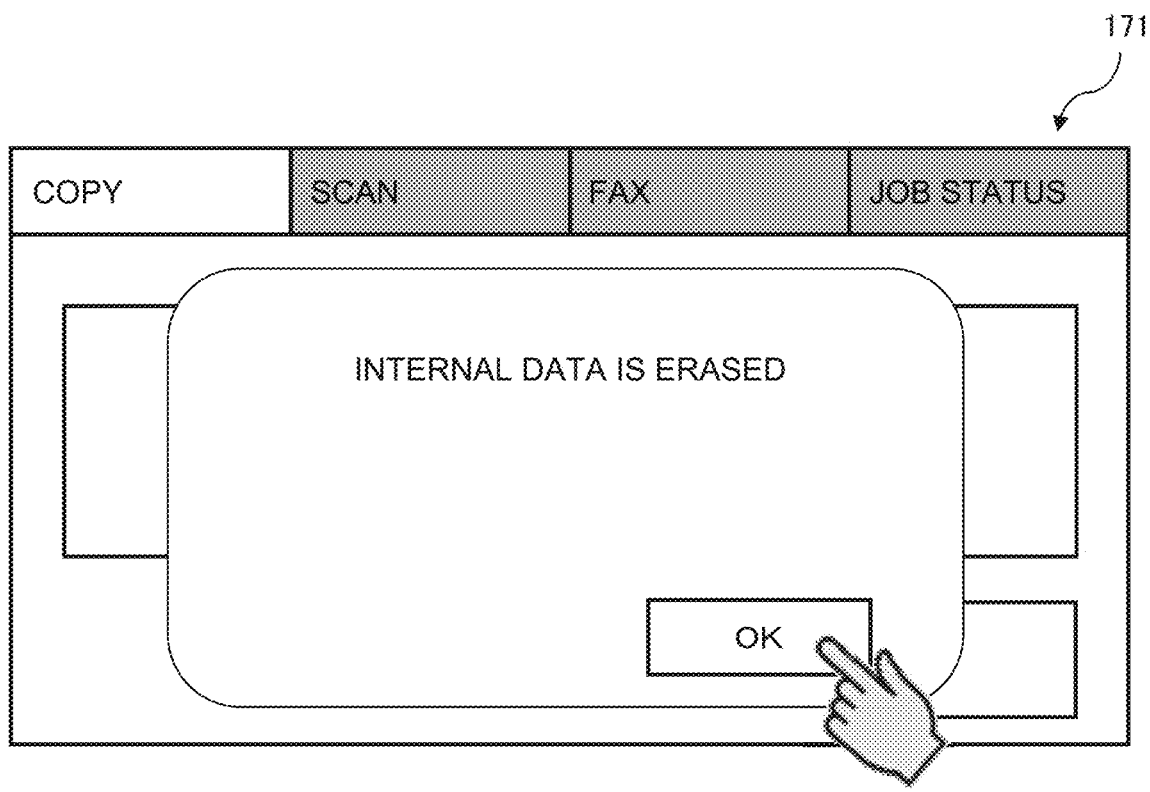
FIG. 6 is an example of an erasure messages of internal data displayed on a display of the digital multifunction printer in FIG. 1.

FIG. 6 is an exemplary erasure message of internal data displayed on the display 171 of the digital multifunction printer 1 in FIG. 1.

As shown in FIG. 6, a message of "INTERNAL DATA IS ERASED" is displayed as pop-up on the display 171.

A user checks the message, and then presses an "OK" key down to close the message.

By contrast, if a subsequent process is present (if determination at step S14 is Yes), the controller 10 at step S16 erases work memory and then terminates processing without making the display 171 display an erasure message (step S16).

Figure 7:
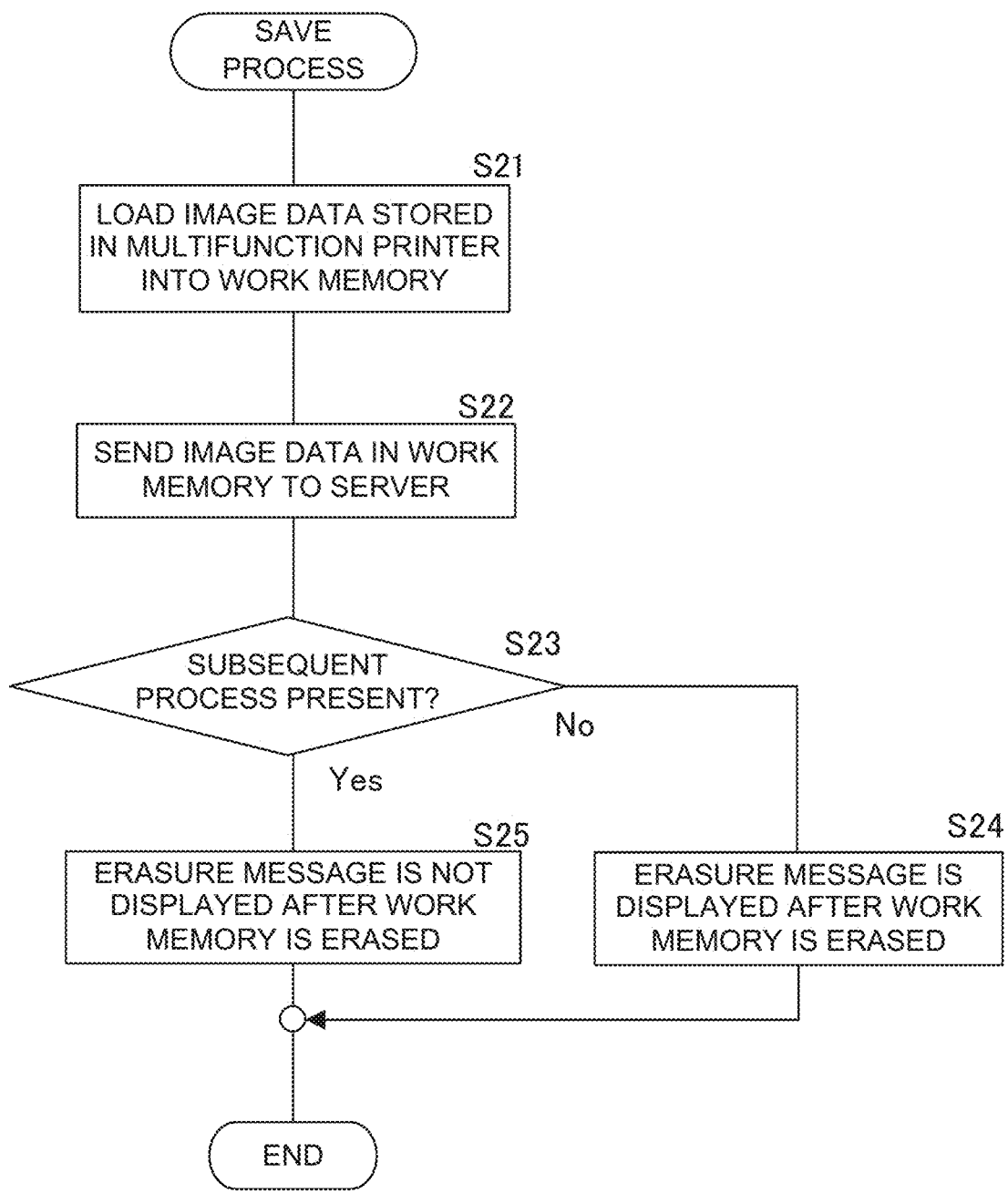
FIG. 7 is a flowchart showing an exemplary save process in FIG. 4.

FIG. 7 is a flowchart showing an exemplary save process in FIG. 4.

At step S21 in FIG. 7, the controller 10 loads image data saved in the storage 13 to work memory (step S21).

Then, at step S22, the controller 10 makes the image data in work memory sent to the server 2 via the communicator 15 (step S22).

Then, at step S23, the controller 10 determines whether a subsequent process is present (step S23).

If a subsequent process is absent (if determination at step S23 is No), the controller 10 at step S24 erases work memory and then makes the display 171 display an erasure message informing the erasure (step S24).

By contrast, if a subsequent process is present (if determination at step S23 is Yes), the controller 10 at step S25 erases work memory and then terminates processing without making the display 171 display an erasure message (step S25).

Figure 8:
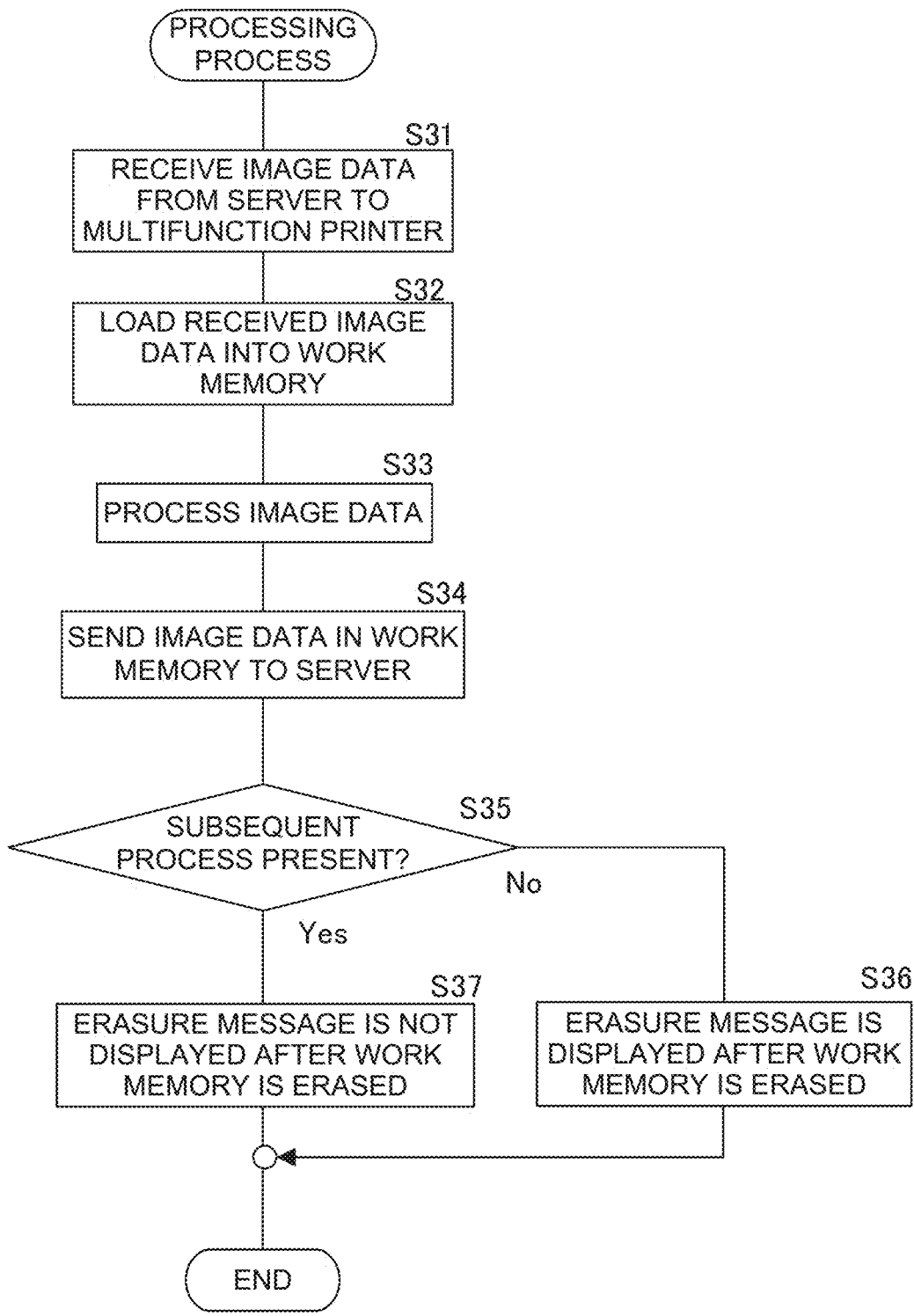
FIG. 8 is a flowchart showing an exemplary processing process in
FIG. 4.

FIG. 8 is a flowchart showing an exemplary processing process in FIG. 4.

At step S31 in FIG. 8, the controller 10 makes the communicator 15 receive image data from the server 2 (step S31).

Then, at step S32, the controller 10 loads the received image data to work memory (step S32).

Then, at step S33, the controller 10 makes the image processor 14 process the image data (step S33).

Then, at step S34, the controller 10 makes the image data in work memory sent to the server 2 via the communicator 15 (step S34).

Then, at step S35, the controller 10 determines whether a subsequent process is present (step S35).

If a subsequent process is absent (if determination at step S35 is No), the controller 10 at step S36 erases work memory and then terminates processing without making the display 171 display an erasure message informing the erasure (step S36).

By contrast, if a subsequent process is present (if determination at step S35 is Yes), the controller 10 at step S37 erases work memory and then does not make the display 171 display an erasure message (step S37).

Figure 9:
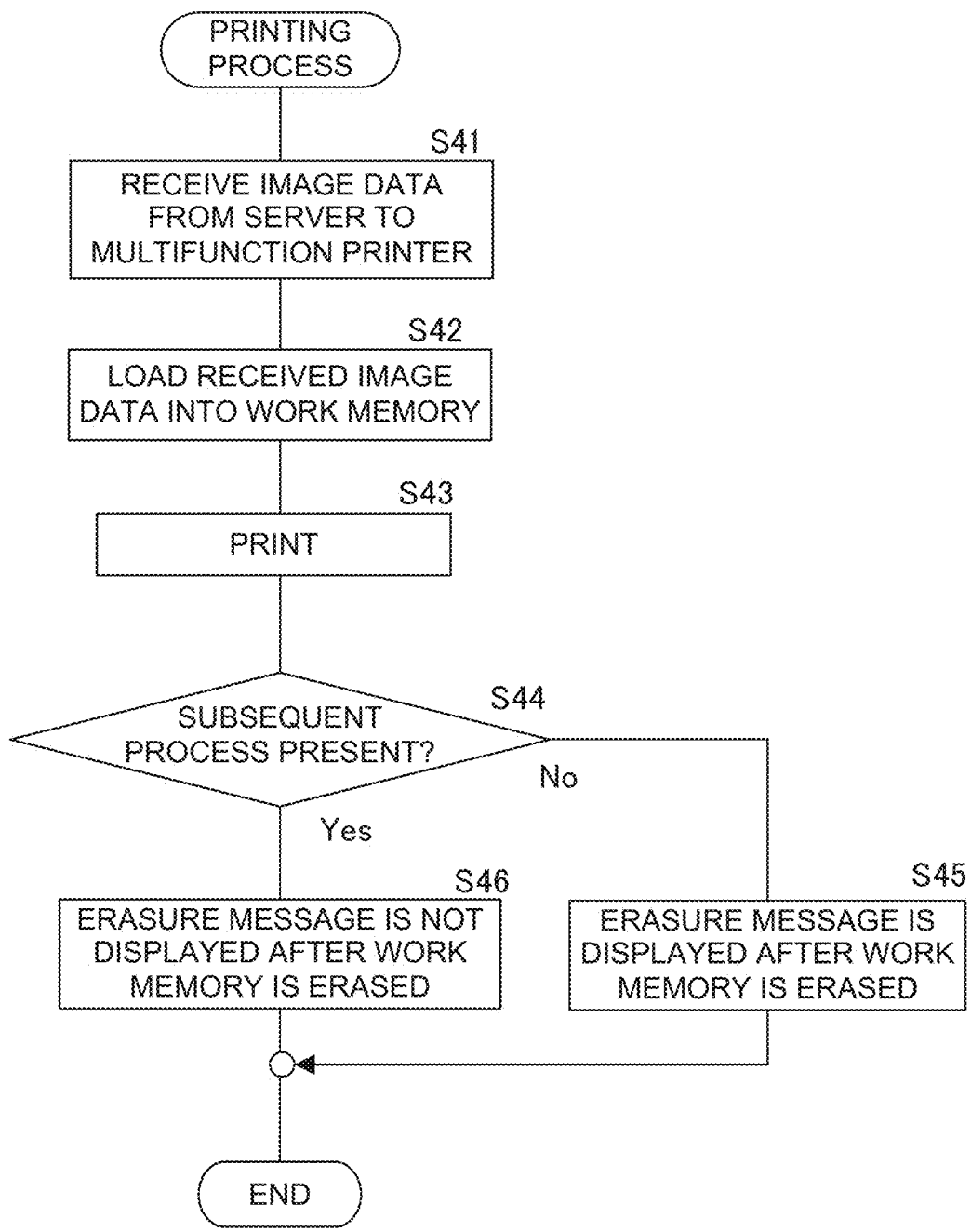
FIG. 9 is a flowchart showing an exemplary printing process in FIG. 4.

FIG. 9 is a flowchart showing an exemplary printing process in FIG. 4.

At step S41 in FIG. 9, the controller 10 makes the communicator 15 receive image data from the server 2 (step S41).

Then, at step S42, the controller 10 loads the received image data to work memory (step S42).

Then, at step S43, the controller 10 makes the image former 12 print the received image data (step S43).

Then, at step S44, the controller 10 determines whether a subsequent process is present (step S44).

If a subsequent process is absent (if determination at step S44 is No), the controller 10 at step S45 erases work memory and then makes the display 171 display an erasure message (step S45).

By contrast, if a subsequent process is present (if determination at step S44 is Yes), the controller 10 at step S46 erases work memory and then terminates processing without making the display 171 display an erasure message informing the erasure (step S46).

In this manner, while the display 171 is made to display no erasure message in presence of a subsequent process, the display 171 is made to display an erasure message in only absence of a subsequent process causes, thereby allowing undesired display of an erasure message to be suppressed.

Embodiment 2

Next, on the basis of FIG. 10-FIG. 14, description will be made for an exemplary displaying process of an erasure message in the digital multifunction printer 1 of Embodiment 2 according to the present invention.

In Embodiment 1, when internal data continued to be used, no erasure message was made to be displayed.

However, such processing is based on performing a subsequent next operation, and thus if some malfunction occurs and a series of processes is suspended and no longer capable of continuing, internal data are likely to be not erased or to be recognized as not erased.

In such case, even with setting to execute an erasure message at the end of a series of processes, if the processing fails to reach that extent due to malfunction, an erasure message is no longer capable of being displayed.

To cope with this, Embodiment 2 provides time-out to prevent such situation, and enables internal data to be surely erased even if a series of processes fails to continue to the last due to some malfunction.

The schematic configuration of the digital multifunction printer 1 according to Embodiment 2 is the same as that of Embodiment 1 (FIG. 2), and thus description is omitted.

The flow of the displaying process of an erasure message in the digital multifunction printer 1 according to Embodiment 2 is also the same as that of Embodiment 1 (FIG. 4), and thus description is omitted.

FIG. 10-FIG. 13 are flowcharts showing respectively and exemplarily a readout process, a save process, a processing process, and a printing process of a copy job of the digital multifunction printer 1 according to Embodiment 2 in the present invention.

Figure 10:
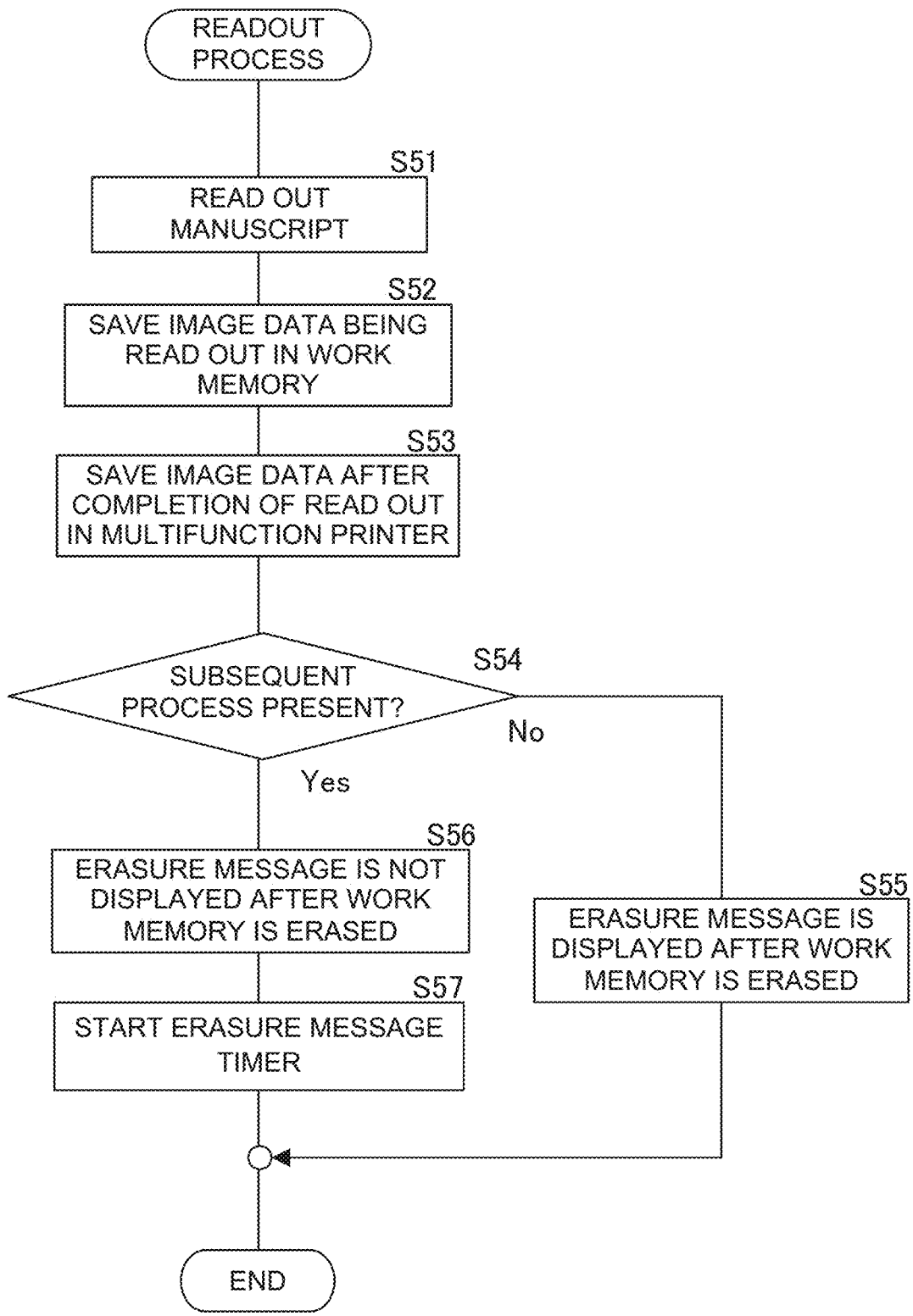
FIG. 10 is a flowchart showing an exemplary readout process of a copy job of a digital multifunction printer according to Embodiment 2 in the present invention.

In FIG. 10, the processes at steps S51-S56 respectively correspond to the processes at steps S11-S16 in FIG. 5, and thus description is omitted.

In the following, description will be made for the process at step S57 in FIG. 10 not described in Embodiment 1.

At step S56 in FIG. 10, the controller 10 erases work memory, and then advances processing to a next step without making the display 171 display an erasure message (step S56).

The controller 10 at the subsequent step S57 makes the timer 16 start an erasure message timer (step S57).

Figure 11:
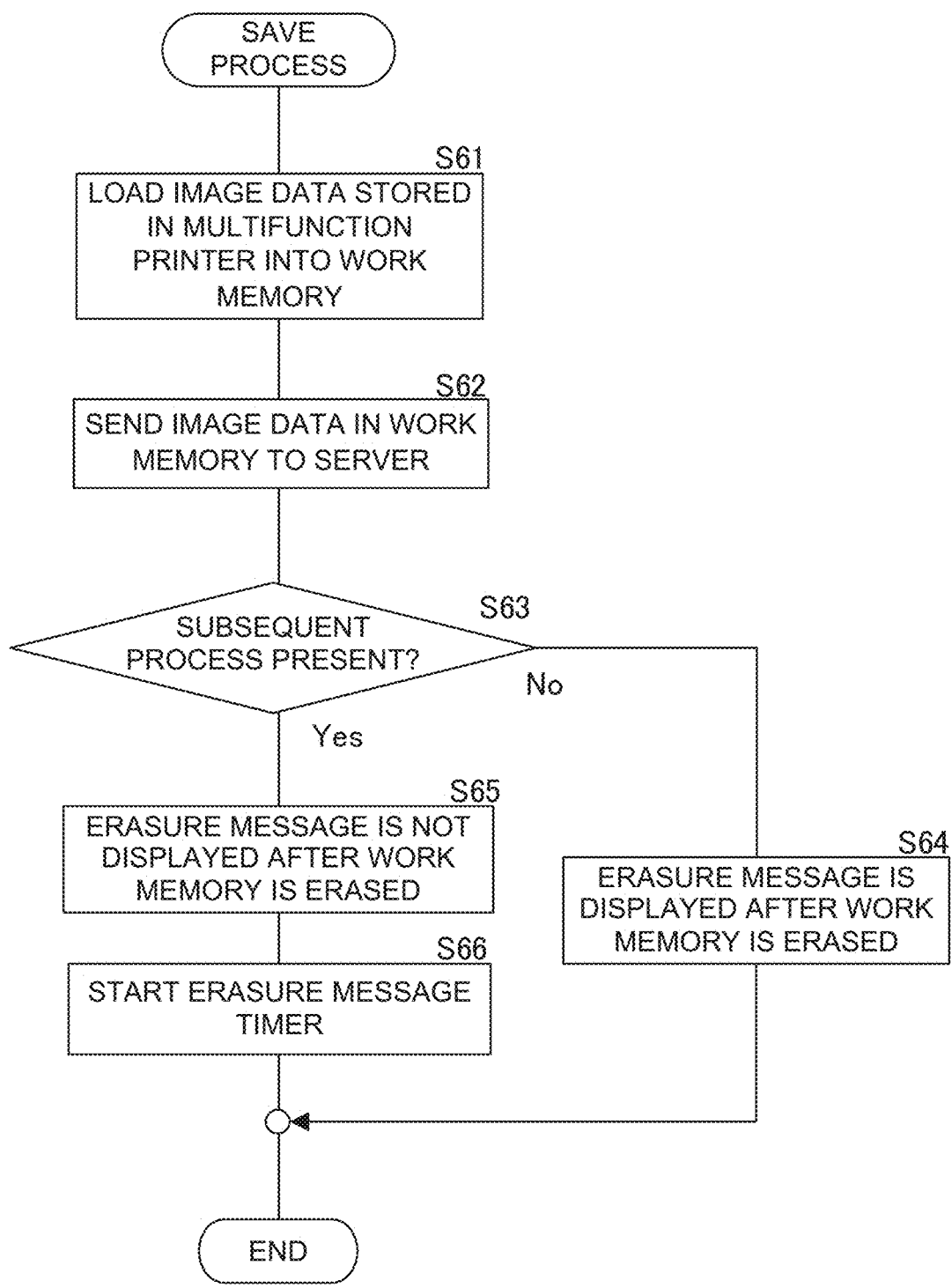
FIG. 11 is a flowchart showing an exemplary save process of a copy job of the digital multifunction printer according to Embodiment 2 in the present invention.
Figure 12:
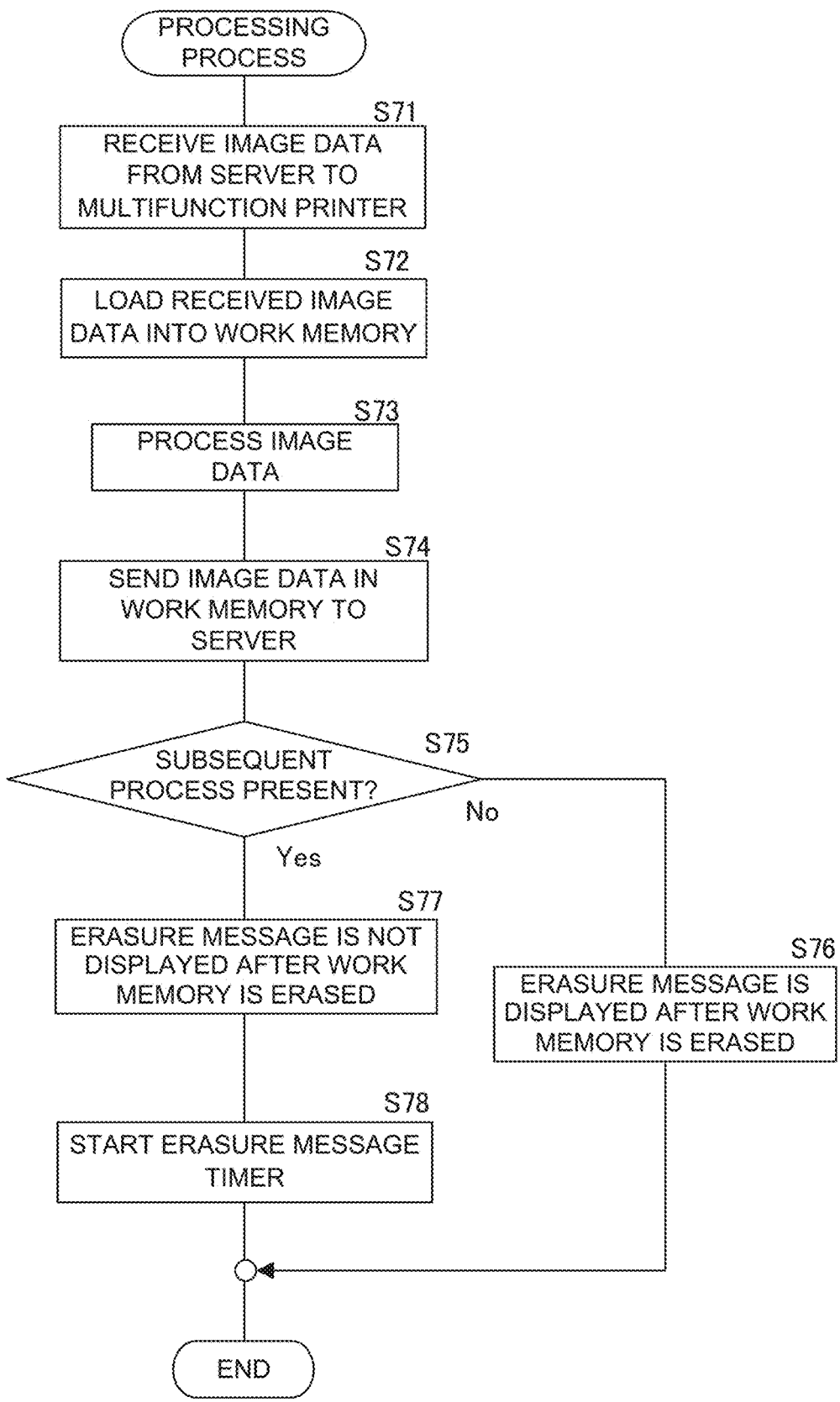
FIG. 12 is a flowchart showing an exemplary processing process of a copy job of the digital multifunction printer according to Embodiment 2 in the present invention.
Figure 13:
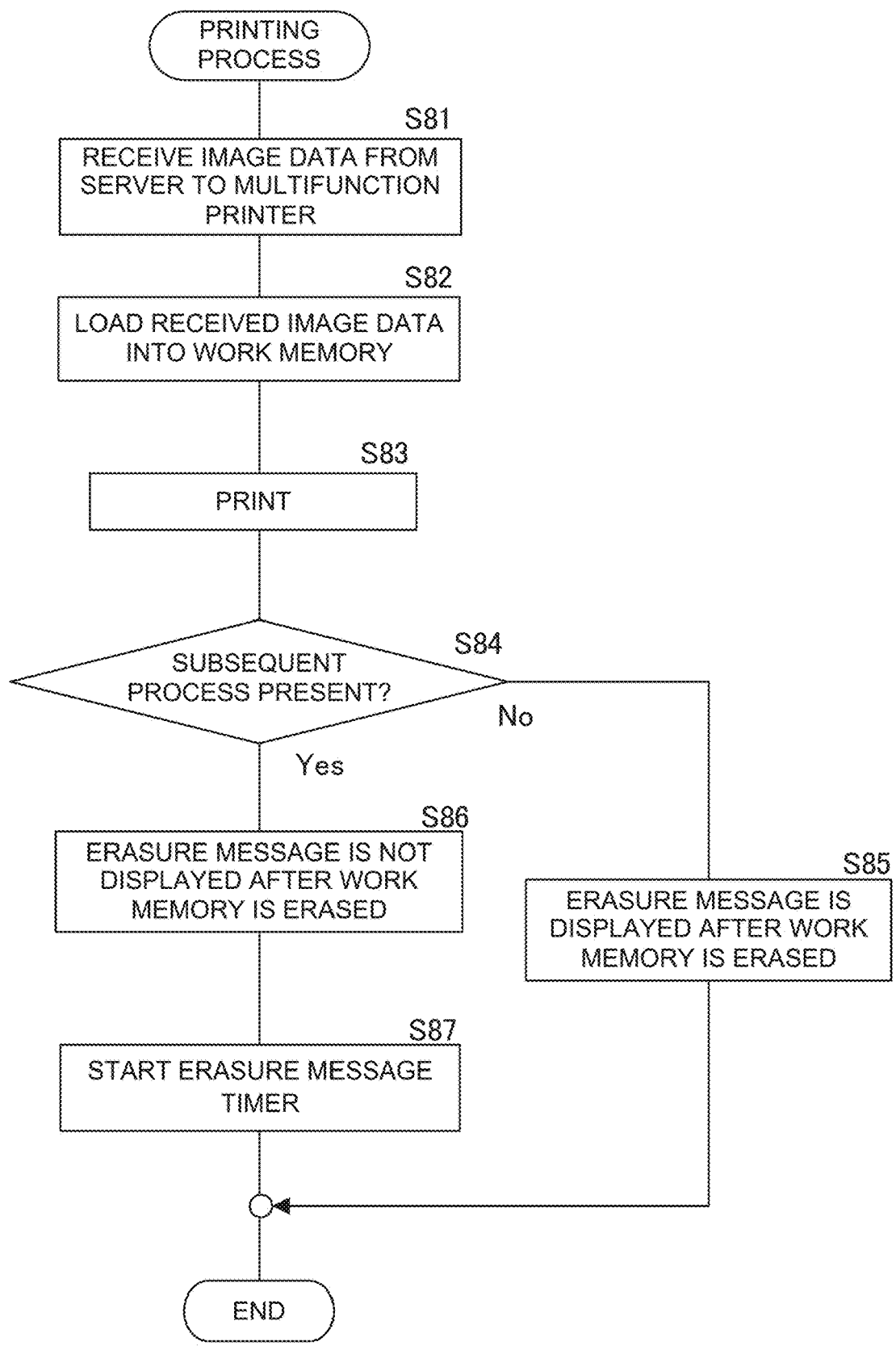
FIG. 13 is a flowchart showing an exemplary printing process of a copy job of the digital multifunction printer according to Embodiment 2 in the present invention.

Similarly, in the save process in FIG. 11, the processing process in FIG. 12, and the printing process in FIG. 13, the controller 10 also makes the timer 16 start an erasure message timer (steps S66, S78, S87).

Figure 14:
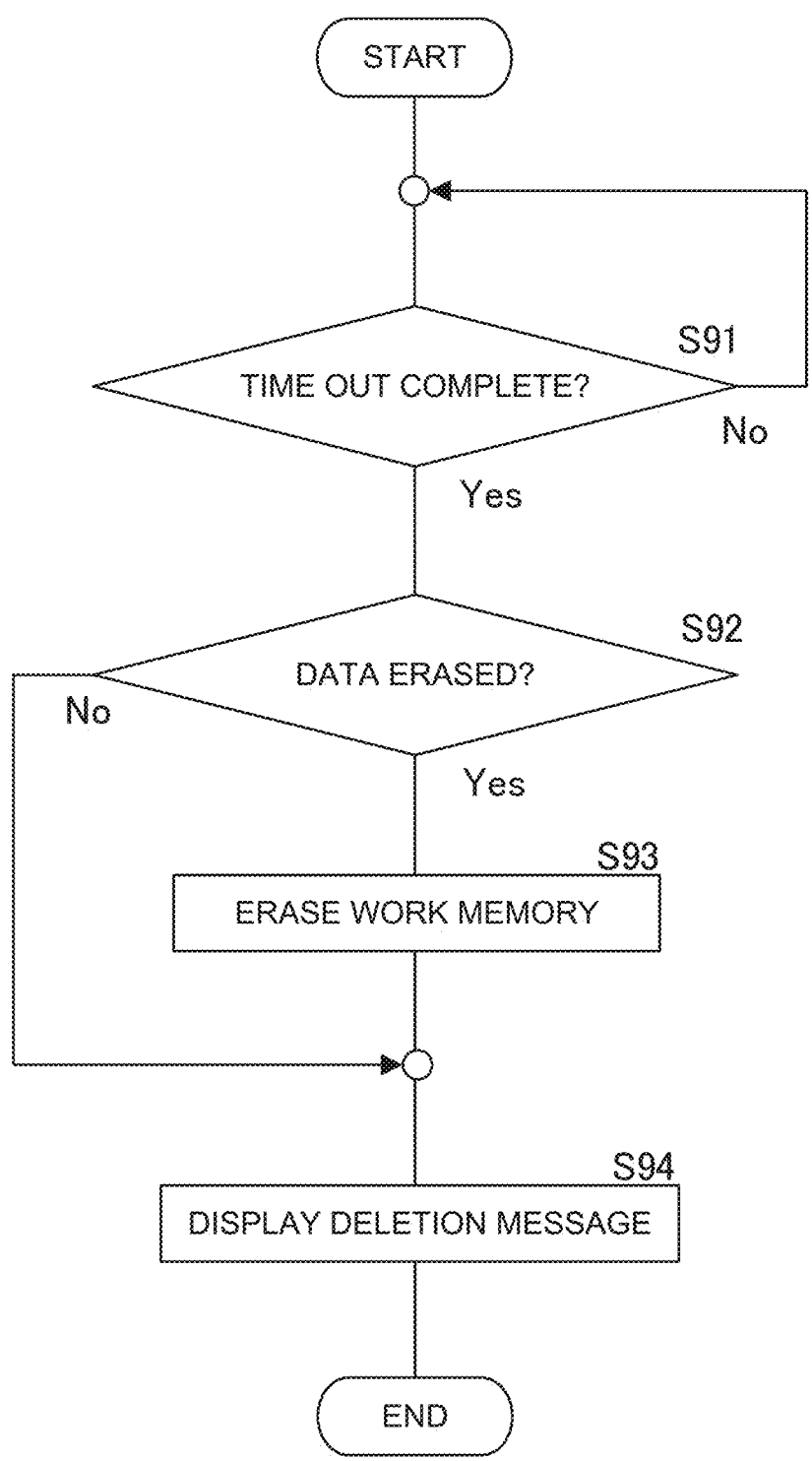
FIG. 14 is a flowchart showing an exemplary message erasure process by a timer in the digital multifunction printer according to Embodiment 2 in the present invention.

FIG. 14 is a flowchart showing an exemplary message erasure process by a timer 16 in the digital multifunction printer 1 according to Embodiment 2 in the present invention.

At step S91 in FIG. 14, the controller 10 determines whether the erasure message timer started by the timer 16 is in time-out (step S91).

If the erasure message timer is not in time-out of determination at step S91 is No), the controller 10 repeats determination of step S91 (step S91).

By contrast, if the erasure message timer is in time-out (if determination at step S91 is Yes), the controller 10 at step S92 determines whether data are erased (step S92).

If the image data are erased (if determination at step S92 is Yes), the controller 10 erases work memory from the storage 13 (step S93).

Subsequently, at step S94, the controller 10 makes the display 171 display an erasure message (step S94).

By contrast, if the image data are not erased at step S92 (if determination at step S92 is No), the controller 10 at step S94 makes the display 171 display an erasure message (step S94).

In this way, even if a series of processes fails to continue to the last due to some malfunction, an erasure message indicating erasure of the internal data is capable of being displayed after a lapse of predetermined hold time, thereby providing the digital multifunction printer 1 with higher user convenience than ever before.

Embodiment 3

Next, on the basis of FIG. 15-FIG. 18, description will be made for an exemplary displaying process of an erasure message in the digital multifunction printer 1 of Embodiment 3 according to the present invention.

In Embodiment 1, depending on presence or absence of a subsequent process, work memory is erased and followed by determining whether an erasure message should be displayed.

Meanwhile, even if a subsequent process is present, internal data processed so far may not be available, for example, in the case that data to be transferred to a next open API is not the same as data obtained by a previous open API and thus partly processed or edited and then transferred.

In this way, even if internal data are not transferred to a next open API, the internal data are erased, and display of an erasure message is thus suppressed because display of an erasure message for each erasure is likely to mislead a user.

By contrast, if internal data are transferred to a next open API, the internal data are not erased, but it is preferable that an erasure message timer be started in the same manner as in Embodiment 2 in view of security.

To cope with this, in Embodiment 3, an erasure message of internal data is set to be informed at an appropriate timing depending on presence or absence of internal data to be transferred, and the internal data is set to be capable of being surely erased even if a series of processes fails to continue to the last due to some malfunction.

The schematic configuration of the digital multifunction printer 1 according to Embodiment 3 is the same as that of Embodiment 1 (FIG. 2), and thus description is omitted.

The flow of the displaying process of an erasure message in the digital multifunction printer 1 according to Embodiment 3 is also the same as that of Embodiment 1 (FIG. 4), and thus description is omitted.

FIG. 15-FIG. 18 are flowcharts showing respectively and exemplarily a readout process, a save process, a processing process, a printing process of a copy job of the digital multifunction printer 1 according to Embodiment 3 in the present invention.

Figure 15:
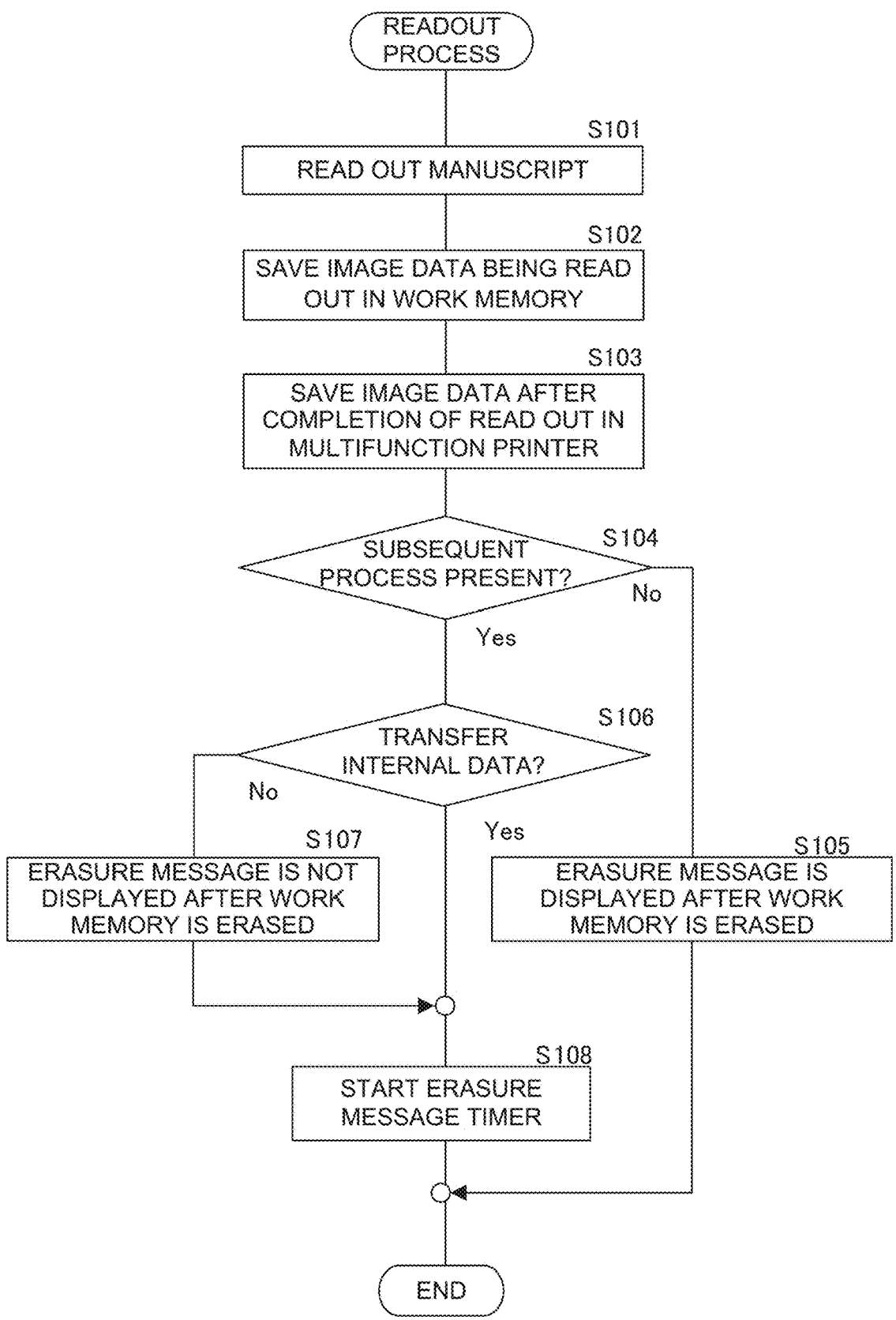
FIG. 15 is a flowchart showing an exemplary readout process of a copy job of a digital multifunction printer according to Embodiment 3 in the present invention.

In FIG. 15, the processes at steps S101-S105 respectively correspond to the processes at steps S11-S15 in FIG. 5, and thus description is omitted.

In the following, description will be made for the processes at steps S106-S108 in FIG. 15 not described in Embodiment 1.

At step S104 in FIG. 15, if a subsequent process is present (if determination at step S104 is Yes), the controller 10 at step S106 determines whether internal data are to be transferred (step S106).

If internal data are not to be transferred (if determination at step S106 is No), the controller 10 at step S107 erases work memory and then does not make the display 171 display an erasure message (step S107).

Subsequently, the controller 10 at step S108 makes the timer 16 start an erasure message timer (step S108).

By contrast, if internal data are to be transferred (if determination at step S106 is Yes), the controller 10 at step S108 makes the timer 16 start an erasure message timer (step S108).

Figure 16:
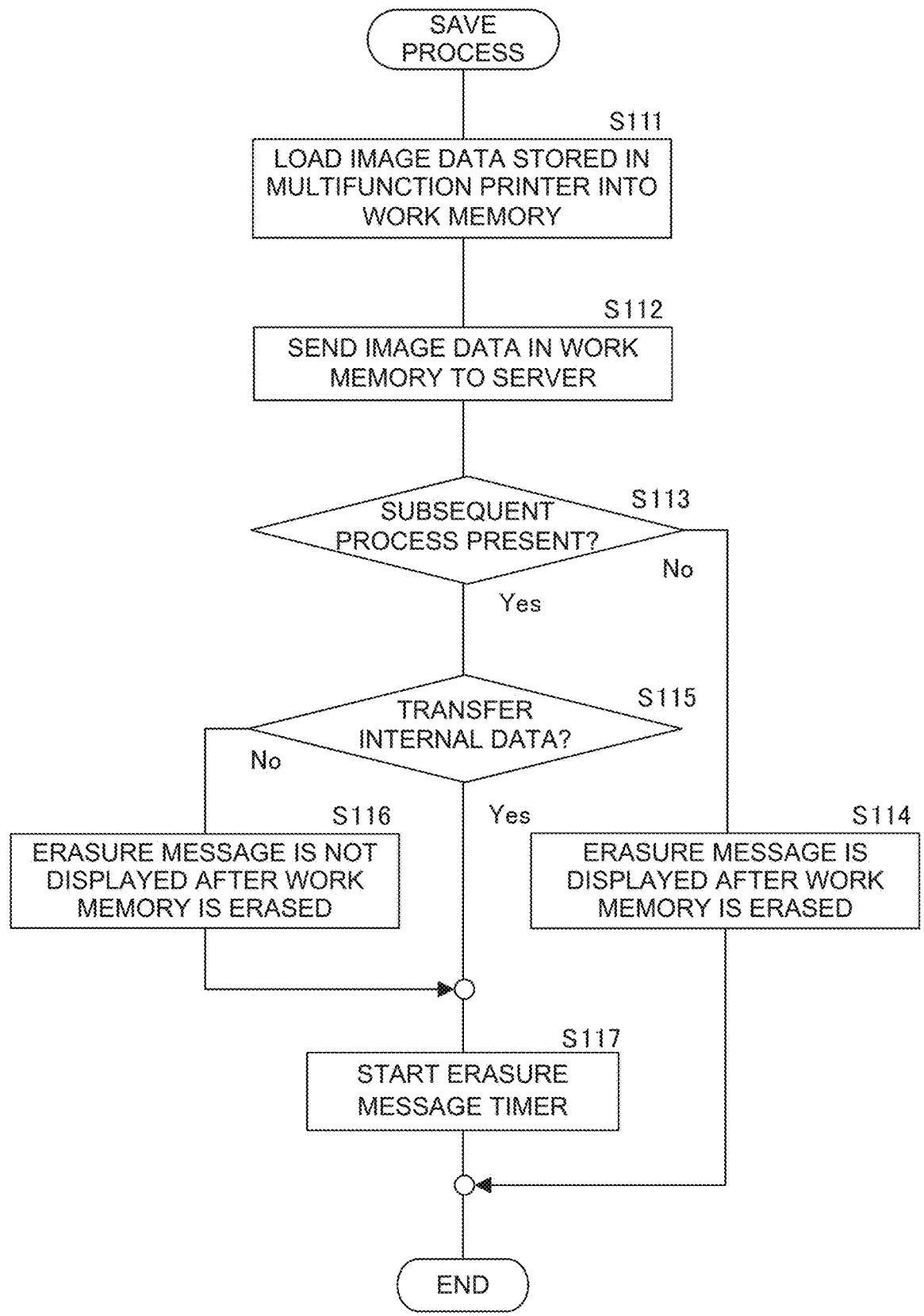
FIG. 16 is a flowchart showing an exemplary save process of a copy job of the digital multifunction printer according to Embodiment 3 in the present invention.
Figure 17:
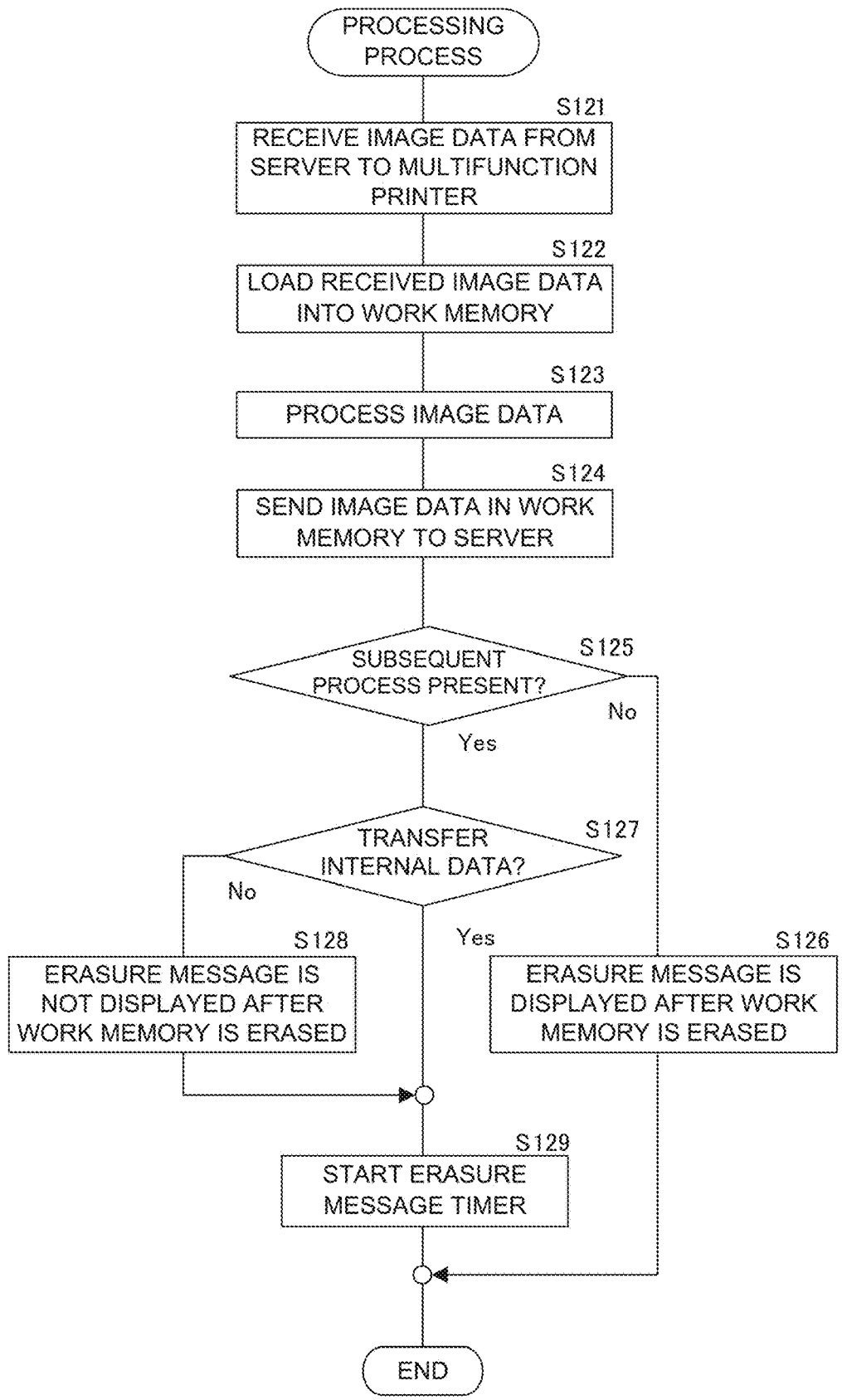
FIG. 17 is a flowchart showing an exemplary processing process of a copy job of the digital multifunction printer according to Embodiment 3 in the present invention.
Figure 18:
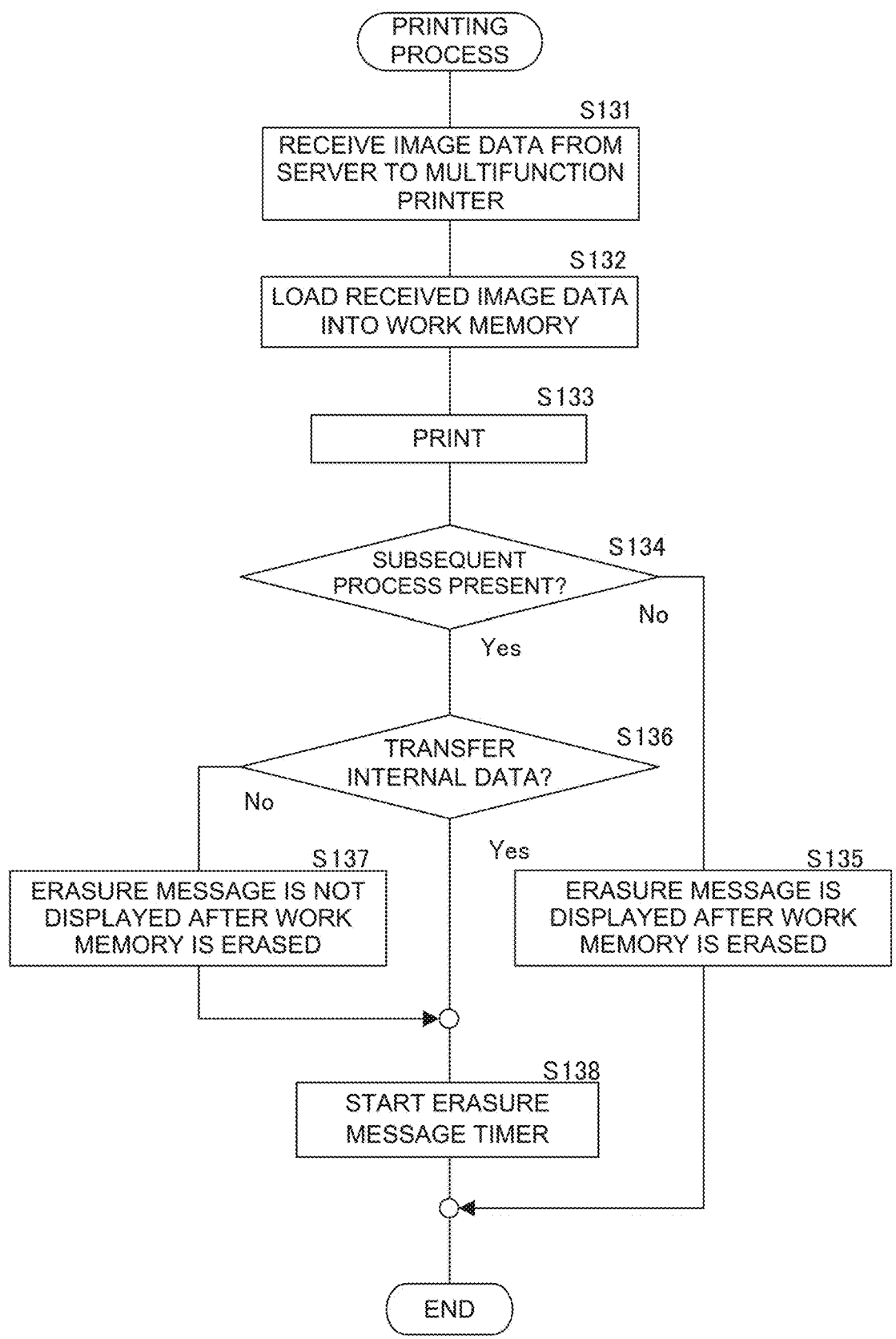
FIG. 18 is a flowchart showing an exemplary printing process of a copy job of the digital multifunction printer according to Embodiment 3 in the present invention.

Similarly, in the save process in FIG. 16, the processing process in FIG. 17, and the printing process in FIG. 18, the controller 10 also performs processing depending on presence or absence of internal data to be transferred (steps S115-S117, S127-S129, and S136-S138).

In this way, an erasure message of internal data is informed at an appropriate timing depending on presence or absence of internal data to be transferred, and furthermore, internal data are capable of being surely erased even if a series of processes fails to continue to the last due to some malfunction, thereby providing the digital multifunction printer 1 with higher user convenience than ever before.

Embodiment 4

Next, on the basis of FIG. 19-FIG. 22, description will be made for an exemplary displaying process of an erasure message in the digital multifunction printer 1 of Embodiment 4 according to the present invention.

If an erasure message is not made to be displayed at deletion of internal data (work data), a user is likely to feel anxious.

To cope with this, Embodiment 4 is set to allow a user to prespecify the content of a message so as to display as a message how to process internal data and what the process includes.

The schematic configuration of the digital multifunction printer 1 according to Embodiment 4 is the same as that of Embodiment 1 (FIG. 2), and thus description is omitted.

The flow of the displaying process of an erasure message in the digital multifunction printer 1 according to Embodiment 4 is also the same as that of Embodiment 1 (FIG. 4), and thus description is omitted.

FIG. 19-FIG. 22 are flowcharts showing respectively and exemplarily a readout process, a save process, a processing process, and a printing process of a copy job of the digital multifunction printer 1 according to Embodiment 4 in the present invention.

Figure 19:
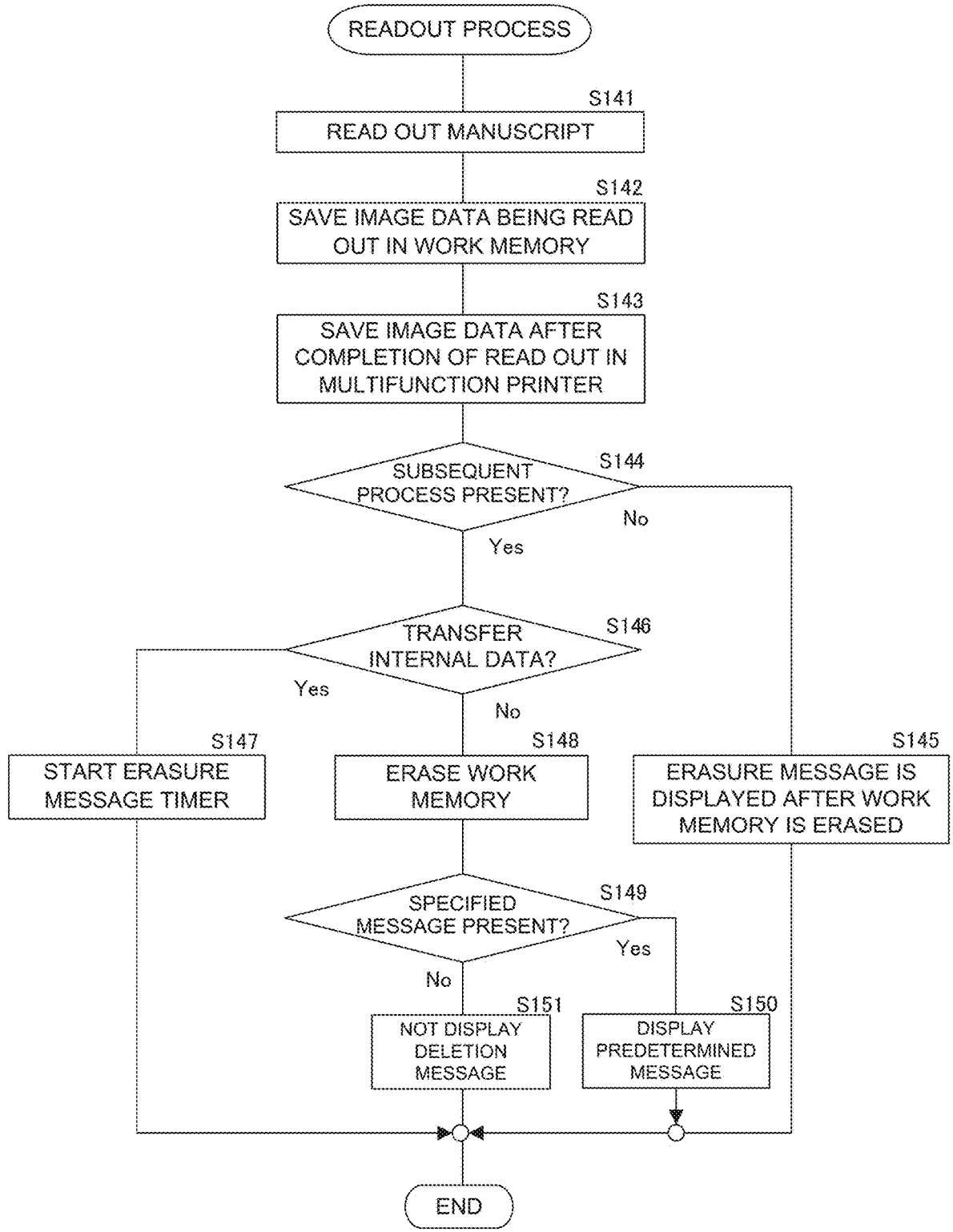
FIG. 19 is a flowchart showing an exemplary readout process of a copy job of a digital multifunction printer according to Embodiment 4 in the present invention.

In FIG. 19, the processes at steps S141-S145 respectively correspond to the processes at steps S11-S15 in FIG. 5, and thus description is omitted.

In the following, description will be made for the processes at steps S146-S151 in FIG. 15 not described in Embodiment 1.

At step S144 in FIG. 19, if a subsequent process is present (if determination at step S144 is Yes), the controller 10 at step S146 determines whether internal data are to be transferred (step S146).

If internal data are to be transferred (if determination at step S146 is Yes), the controller 10 at step S147 makes the timer 16 start an erasure message timer (step S147).

By contrast, if internal data are not to be transferred of determination at step S146 is No), the controller 10 at step S148 erases work memory (step S148).

At the subsequent step S149, the controller 10 determines whether a message prespecified by a user is present (step S149).

For example, after scanning, if next data are to be processed, display of a message of "READ-OUT MANUSCRIPT IS ENCRYPTED AND SAVED. WORK MEMORY IS TO BE ERASED." allows a user to clearly understand the content of the processing.

Furthermore, the message may be set to be displayed in the language specified by a user.

If a prespecified message is present at step S149 (if determination at step S149 is Yes), the controller 10 at step S150 makes the display 171 display the message (step S150).

By contrast, if a prespecified message is absent (if determination at step S149 is No), the controller 10 at step S151 does not make the display 171 display the message (step S151).

Figure 20:
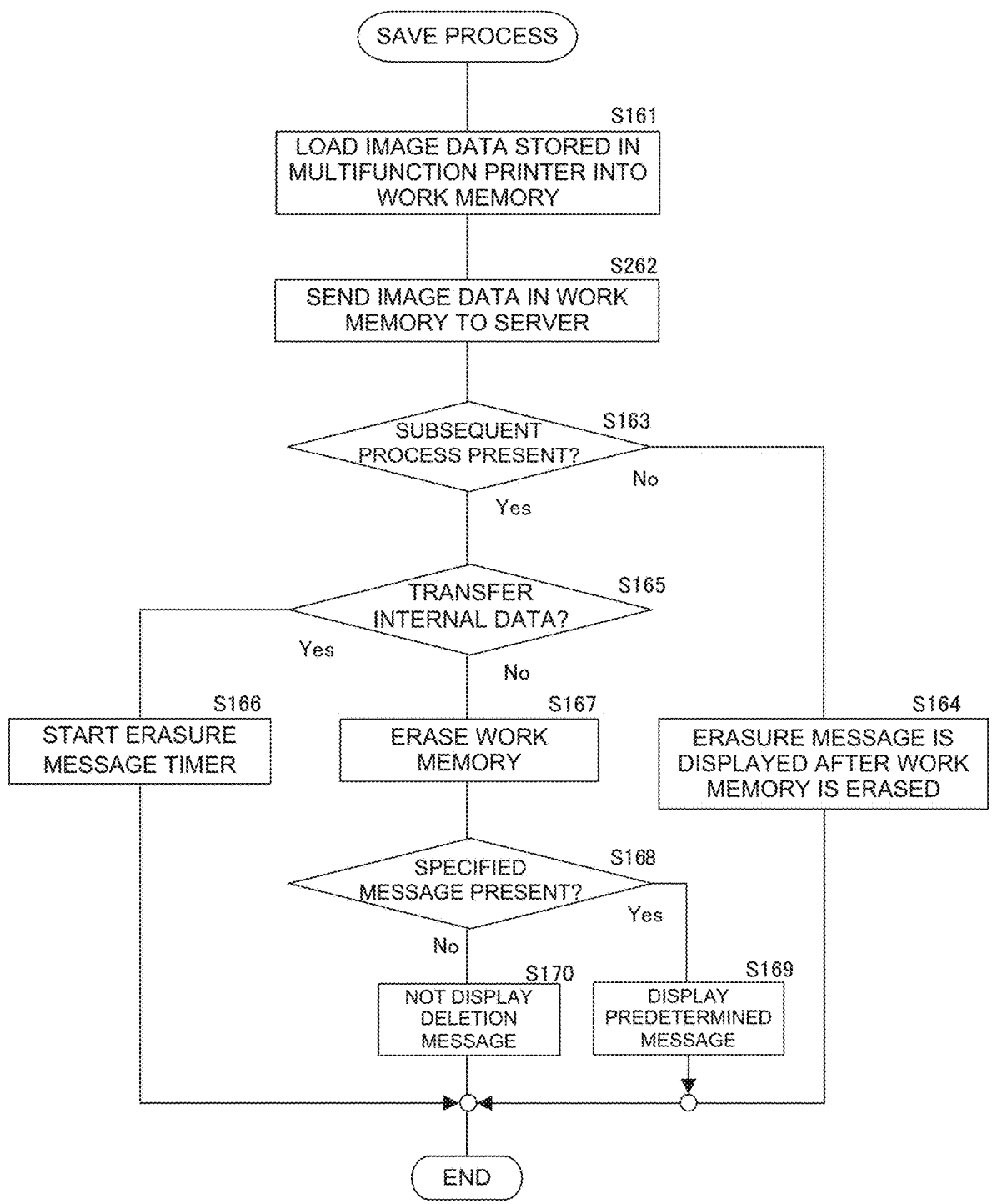
FIG. 20 is a flowchart showing an exemplary save process of a copy job of the digital multifunction printer according to Embodiment 4 in the present invention.
Figure 21:
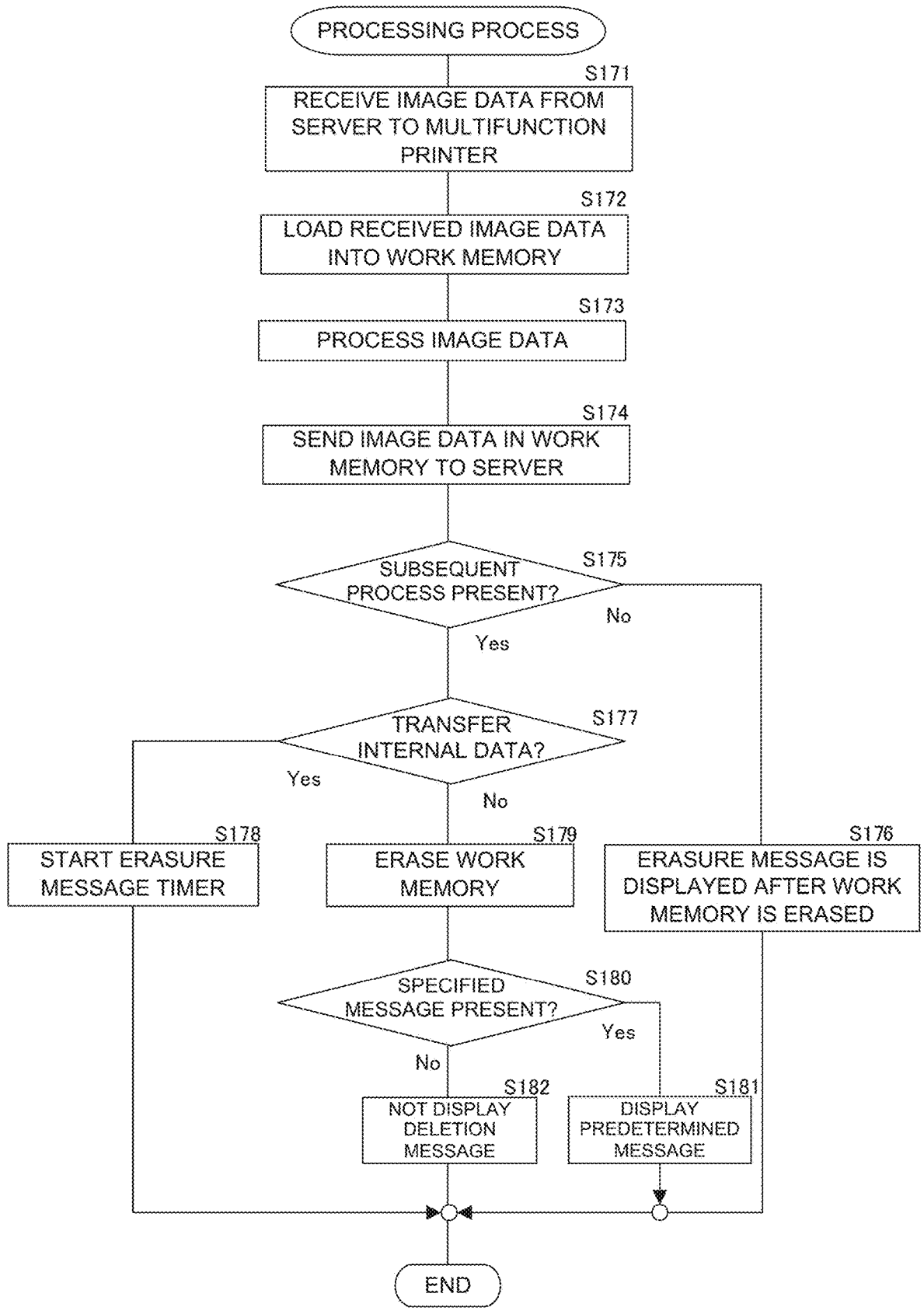
FIG. 21 is a flowchart showing an exemplary processing process of a copy job of the digital multifunction printer according to Embodiment 4 in the present invention.
Figure 22:
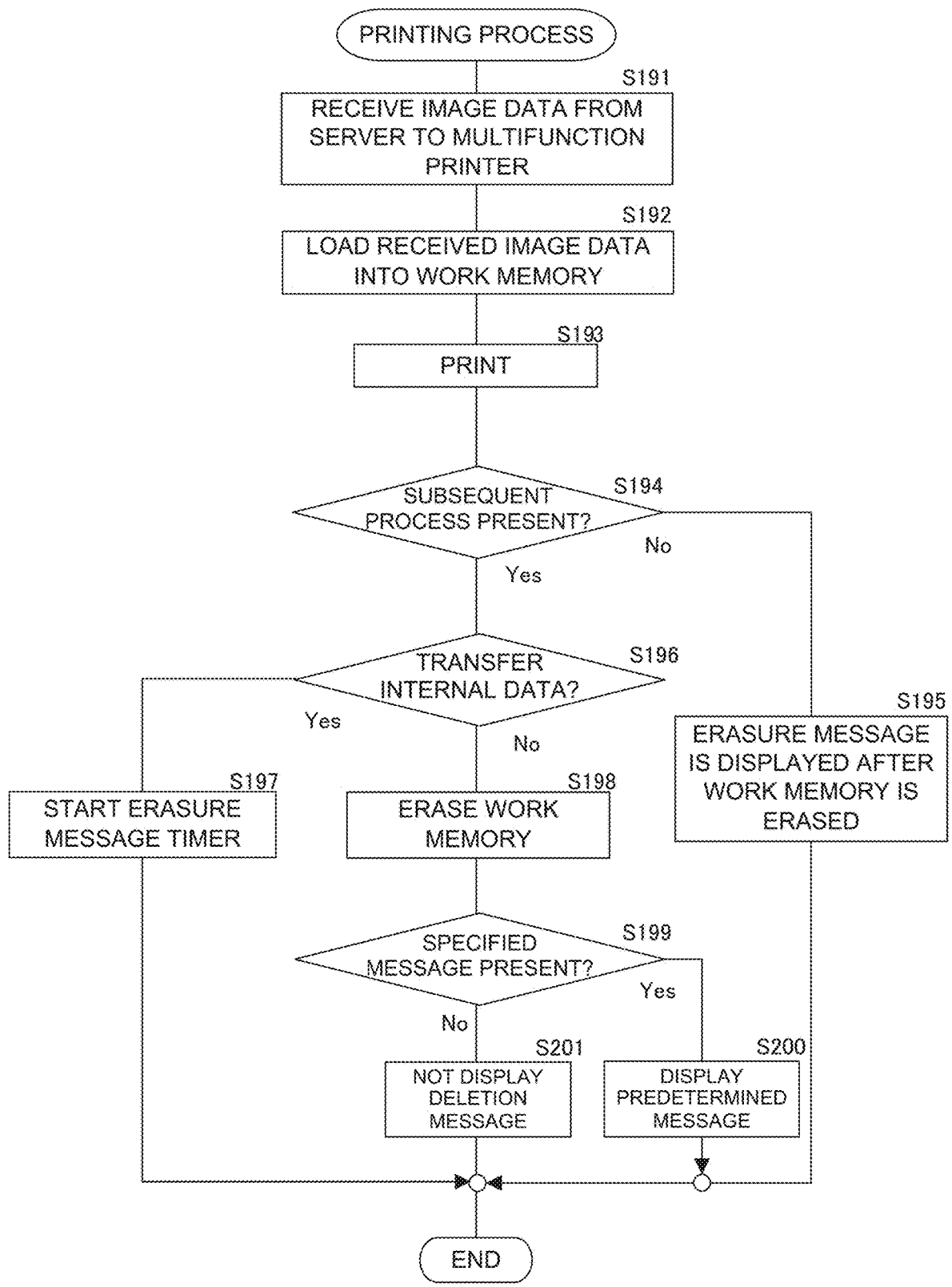
FIG. 22 is a flowchart showing an exemplary printing process of a copy job of the digital multifunction printer according to Embodiment 4 in the present invention.

Similarly, in the save process in FIG. 20, the processing process in FIG. 21, and the printing process in FIG. 22, the controller 10 also performs processing depending on presence or absence of a prespecified message (steps S165-S170, S177-S182, and S196-S201).

In this way, an erasure message prespecified by a user is informed at an appropriate timing depending on presence or absence of a prespecified message, and furthermore, internal data are capable of being surely erased even if a series of processes fails to continue to the last due to some malfunction, thereby providing the digital multifunction printer 1 with higher user convenience than ever before.

Preferable aspects of the present invention also include combinations of any of the plurality of aspects described above.

In addition to the embodiments described above, various modifications can be made for the present invention. These modifications should not be construed not to fall within the scope of the present invention. The present invention should encompass the claims and all modifications of the equivalents thereof and within the scope.

What is claimed is:

1. An image formation apparatus for combining a plurality of processes to execute a job related to image formation, the image formation apparatus comprising:
   a communicator that sends and receives data to and from an external application via a network;
   an image data acquirer that acquires image data;
   an image former that forms an image based on the image data;
   a storage that stores temporary intermediate data involved in the image formation;
   a display that displays a message for a user; and
   a controller that controls the communicator, the image data acquirer, the image former, the storage, and the display,
   wherein upon performing a process of the plurality of processes, the controller determines whether a next process of the plurality of processes is present, and if the next process is present, the controller erases the intermediate data and then proceeds to the next process without making the display displaying an erasure message indicating an erasure of the intermediate data, while if the next process is absent, the controller erases the intermediate data and then makes the display displaying the erasure message indicating the erasure of the intermediate data.

2. The image formation apparatus according to claim 1, wherein when the controller erases the intermediate data and then proceeds to the next process without making the display displaying the erasure message indicating the erasure of the intermediate data, the controller makes the display displaying the erasure message indicating the erasure of the intermediate data after a lapse of predetermined hold time.

3. The image formation apparatus according to claim 1, wherein when the controller performs the process and then has the next process to be performed, the controller determines whether the intermediate data are to be transferred, and if the intermediate data are not to be transferred, the controller erases the intermediate data and then proceeds to the next process without making the display displaying the erasure message indicating the erasure of the intermediate data, while if the intermediate data are to be transferred, the controller makes the display displaying the erasure message indicating the erasure of the intermediate data after a lapse of predetermined hold time.

4. The image formation apparatus according to claim 1, wherein the controller erases the intermediate data if the controller has the next process to be performed, and then determines whether a message prespecified by the user is stored in the storage, and if the message is stored, the controller makes the display displaying the message, while if the message is not stored, the controller proceeds to the next process without making the display displaying the message.

5. An image formation method of combining a plurality of processes to execute a job related to image formation, the method comprising:
   sending and receiving data to and from an external application via a network;
   acquiring image data;
   forming an image based on the image data;
   storing, in a storage, temporary intermediate data involved in the image formation;

displaying, on a display, a message for a user;
determining, upon performing a process of the plurality of processes, whether a next process of the plurality of processes is present;
if the next process is present, erasing the intermediate data and proceeding to the next process without displaying, on the display, an erasure message indicating an erasure of the intermediate data; and
if the next process is absent, erasing the intermediate data and displaying, on the display, the erasure message indicating the erasure of the intermediate data.

* * * * *